March 16, 1965   I. ALEXEFF   3,174,036
MEASUREMENT OF ULTRA HIGH VACUA BY ELECTRON BOMBARDMENT
AND VACUUM ULTRA VIOLET RADIATION MEASUREMENT
Filed Oct. 4, 1961

United States Patent Office 3,174,036
Patented Mar. 16, 1965

3,174,036
MEASUREMENT OF ULTRA HIGH VACUA BY ELECTRON BOMBARDMENT AND VACUUM ULTRA VIOLET RADIATION MEASUREMENT
Igor Alexeff, 114 W. Lincoln Road, Oak Ridge, Tenn.
Filed Oct. 4, 1961, Ser. No. 142,893
2 Claims. (Cl. 250—43.5)

This invention relates to the measurement of properties of a volume of gas by exciting the gas and counting the photons emitted by the excited gas atoms. My invention comprehends an ultra-high vacuum manometer which may measure vacua to $10^{-14}$ mm. Hg. My invention also comprehends a gas analyzer and a leak detector.

In order to excite the gas whose properties are to be measured I preferably bombard the gas with electrons. However, the invention is not limited to this method of excitation and includes, for example, excitation by ion bombardment, excitation by un-ionized gas atoms, excitation by irradiation with ultra-violet light to cause fluorecence in which the gas atoms emit light of a longer wavelength than that of the incident light, excitation by resonance, irradiation with ultra-violet light in which event the scattered ultra-violet light is measured for example at a 90° angle to the incident light, radio excitation, and thermal excitation.

In accordance with the invention, I measure the ultra-violet light emitted by the excited gas atoms.

In accordance with the invention, the photons thus emitted are counted by means of a gas filled discharge tube having at least two electrodes across which a voltage is kept so that an ionizing event in the gas initiates a strong electrical discharge in the tube. Such a counter tube should be equipped with a quenching circuit or should employ a self-quenching gas such as alcohol vapor, xylol, or halogen quenching gases. The conventional Geiger-Müller counter tube is an example of such a counting tube. In general, present day commercial photomultiplier tubes are not satisfactory for use in carrying out the invention.

Prior art vacuum manometers have utilized thermal conductivity, gas pressure, or viscosity, or bombard the gas with electrons or positive ions with resultant measurement either of the total current or mass analysis. Examples of prior art vacuum manometers include the Knudsen gauge and the McLeod gauge. Only measurement of the total current or mass analysis after electron or ion bombardment are used in ultra-high vacuum measurements.

In the gas analyzer embodiment of the invention a suitable transmission filter is employed in conjunction with the counter tube. Alternatively or in addition to the use of a suitable transmission filter the gas in the counter itself may be chosen such that its ionization potential helps select the photons counted.

The invention may best be understood from the following detailed description thereof having reference to the accompanying drawing in which.

Figure 1:
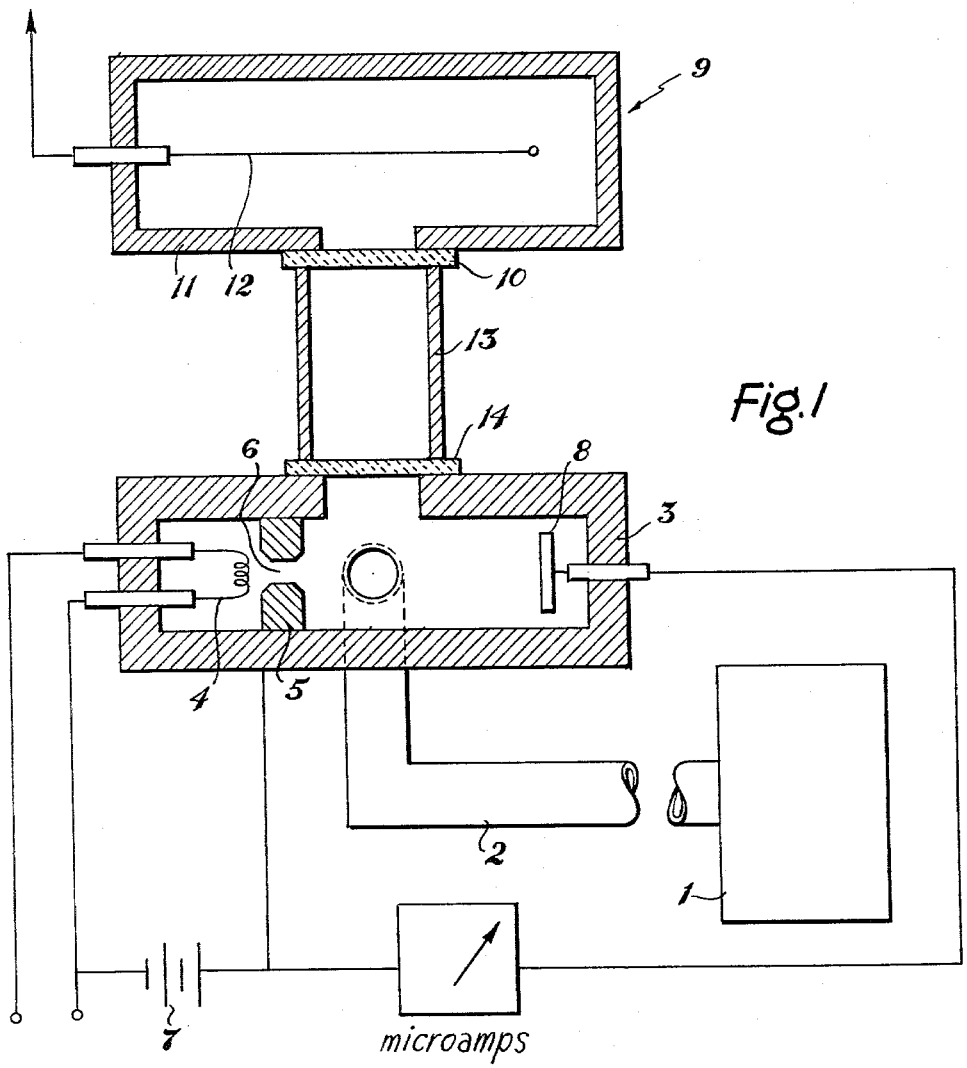
FIG. 1 is a sectional view of one embodiment of the invention.

Referring to the drawing, and first to FIG. 1 thereof, the chamber 1 enclosing the gas whose properties are to be measured is connected by means of a suitable pipe 2 to the photon production chamber 3 which is equipped with electron bombardment means. As shown in the drawing the photon production chamber 3 houses a suitable cathode 4 and accelerating anode 5. Electrons are accelerated from the cathode 4 to the anode 5 through which they pass through the aperture 6. A suitable accelerating potential is provided by the voltage source 7 and may be 100 volts, but the voltage employed is not critical. A suitable collector electrode 8 serves to remove the electrons and collect them. As a result, the residual gas in the vacuum system is bombarded with electrons having, for example, about 100 electron volts energy. Some of the gas atoms are excited and emit light quanta. In accordance with one embodiment of the invention the quanta emitted in the region 1050 to 1600 Angstrom units (the "far ultra-violet") are counted by a suitable counter such as a light sensitive Geiger-Müller tube 9. The counting rate in a system at low pressure is proportional to the product of the electron beam intensity times the rest gas density. Thus the manometer of the invention, as an ionization gauge, measures rest gas density.

Calculation suggest that this new manometer may measure vacua to $10^{-14}$ mm. Hg. The device is capable of measuring high vacua for two reasons: First, the efficiency of counts per excited atom is very good; second, the background counting rate is very low.

The reason for good efficiency in counts per excited atom is as follows. First, most atoms when excited emit strongly in the ultra-violet. Second, Geiger-Müller tubes for the far ultra-violet can be made very sensitive. Tubes giving one count per 100 incident photons have been reported.

The reason for low background counting rate in the Geiger-Müller tube is that the ultra-violet photons needed to cause counts are high energy events when compared to room temperature energies. Thus the Geiger-Müller tube, unlike a photo multiplier, is not sensitive to thermal noise. It is not even sensitive to room light or to light from the filament in the electron source.

The only natural events other than ultra-violet photons that will be counted are those of natural radioactivity and cosmic rays. A typical background counting rate for a cylindrical counter 1″ in diameter by 6″ long is six counts per minute.

As previously described, the device can be used as a manometer. The counting rate is proportional to the electron bombardment current times the gas density. For each gas the constant of proportionality can easily be found experimentally.

When measuring the pressure in a system containing unknown gases, one does not know the constant of proportionality which is required. Hence, this pressure measurement is not exact. This ambiguity of pressure measurements when working with a gas of unknown composition is also present with conventional ion gauges.

Referring again to FIG. 1, it is noted that the electron gun for electron bombardment of the gas therein shown has no electron lenses but is composed only of a tungsten filament 4 and a collimating aperture 6. The photon sensitive Geiger-Müller tube shown at 9 in FIG. 1 is an ordinary Geiger-Müller tube with a photon window 10 of lithium fluoride which may be glued on with a suitable cement, such as Araldite. The counter 9 may be filled, for example, with a filling of 1 centimeter pressure of xylol and ten centimeters pressures of argon. The tube body 11 may be of stainless steel. The central electrode 12 of the Geiger-Müller counter 9 is connected to a high voltage supply and scaler (not shown). The pipe 2 from the photon production chamber 3 to the rest of the vacuum system is equipped with several bends (not shown) between the counting apparatus and any part of the system which may be a source in itself of ultra-violet photons.

A typical result with apparatus of this type is that for oxygen where at $2 \times 10^{-6}$ mm. Hg and for an electron bombardment current of 10 microamperes, 30 counts per second were obtained. If 10 milliamperes had been used, and if the background counting rate had been 0.1 counts per second, then the ultimate pressure measurable would have been $6 \times 10^{-12}$ mm. Hg. This high potential sensitivity is for a crude test system.

It may be desirable in certain cases to add an axial guide magnetic field to the electron gun in order to reduce the photon emission background caused by the bombardment of electrons on the walls.

The device shown in FIG. 1 may also be used as a gas analyzer. If the Geiger-Müller tube 9 in the device were to count only those photons emitted by a specific gas, then the device would measure only the partial density of that specific gas. In one embodiment of the invention this is accomplished by means of a light filter that transmits only the desired photons. Fortunately nature has provided many excellent narrow band transmission filters in the far ultra-violet (1050 to 1600 Angstrom units).

The absorption spectra of many polyatomic gases is characterized by high absorption with isolated transmission "windows" a few Angstroms wide. It is possible that one can find an absorption spectra with a "window" for any desired wavelength.

An excellent example of a gas filter is oxygen. Oxygen has a transmission "window" for the Lyman-alpha light of hydrogen. The window is at 1216 Angstroms and is about 5 Angstroms wide. The absorption coefficient at the center of the window is approximately twenty times less than at the edges. Since the photon absorption is an exponetial affair, for practical purposes one can isolate the Lyman-alpha light of hydrogen. Only two centimeters of oxygen at standard temperature and standard pressure is required.

Other filtering devices for the ultra-violet light are solid filters and special fillings for the Geiger-Müller tube. In addition, one can selectively excite the atoms in the gas to be analyzed by varying the voltage of the bombarding electrons. The difference between air and hydrogen in this connection gave a factor of two in certain test apparatus used.

The device shown in FIG. 1 can thus be made selectively sensitive to the Lyman-alpha light of hydrogen by placing two centimeters of oxygen at standard temperature and standard pressure in the cell 13 between the lithium fluoride window 10 of the Geiger-Müller tube 9 and a similar lithium fluoride window 14 in the wall of the ultra-violet photon source 3. The oxygen is preferably dried with $P_2O_5$, as water vapor is a strong absorber of ultra-violet light. Under these conditions, the counting rate for the device rose twenty times when hydrogen was sprayed over an artificial leak. Thus even a crude test device was a usable leak detector.

Figure 2:
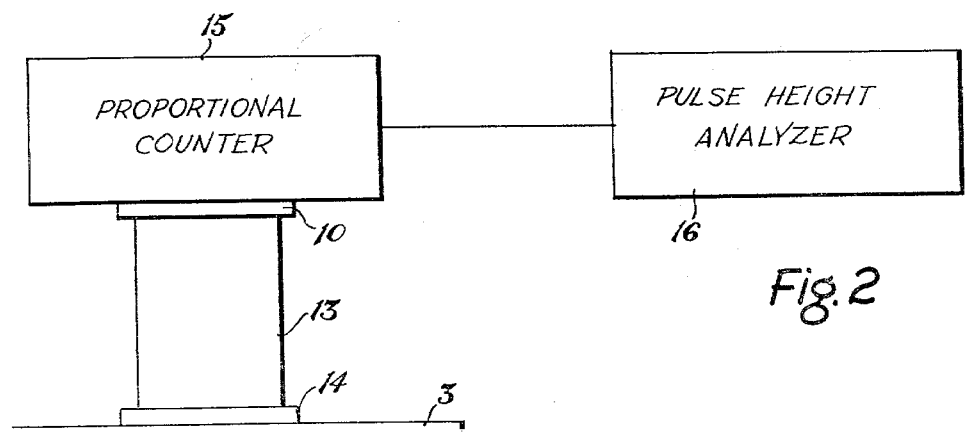
FIG. 2 is a diagrammatic view of a modification of the counting apparatus of FIG. 1.

Referring now to FIG. 2, so far as analysis is concerned, in addition to light filters, and/or the use of a special gas in the counter, a pulse height analysis can be used on the counter output. This pulse height analysis is useable only if the counter, shown at 15 is FIG. 2, operates in such a fashion that the size of its output pulse is proportional to the energy of the ionizing photon. In this case of proportional counter action, the pulse height analysis provided by the pulse height analyzer 16 provides selective measurement of the ionizing events produced by the photons. Since proportional counters and pulse height analyzers are well known in the art, they are merely diagrammatically indicated in FIG. 2.

Having thus described the principles of the invention, together with an illustrative embodiment thereof, it is to be understood that although specific terms are employed, they are used in a generic and descriptive sense and not for purposes of limitation, the scope of the invention being set forth in the following claims.

I claim:

1. The method of measuring ultra-high vacua which method comprises exciting a gas, the pressure of which is in the ultra-high vacuum region, and counting the photons emitted by the excited gas in the far ultra-violet by means of a gas-filled discharge tube having at least two electrodes across which a voltage is kept so that an ionizing event in the gas initiates a strong electrical discharge in the tube.

2. The method of measuring properties of a volume of gas, the pressure of which is in the ultra-high vacuum region, which method comprises bombarding the gas with electrons having an energy below that at which some known gases are excited but above that at which other known gases are excited and counting the photons emitted by the bombarded gas in the far ultra-violet by means of a gas-filled discharge tube having at least two electrodes across which a voltage is kept so that an ionizing event in the gas initiates a strong electrical discharge in the tube.

References Cited in the file of this patent

UNITED STATES PATENTS

| | | |
|---|---|---|
| 2,096,099 | Gaugler | Oct. 19, 1937 |
| 2,403,631 | Brown | July 9, 1946 |
| 2,922,911 | Friedman | Jan. 26, 1960 |
| 2,936,388 | Chubb | May 10, 1960 |
| 2,952,776 | Schumacker | Sept. 13, 1960 |